United States Patent
Shah

(10) Patent No.: US 8,631,408 B2
(45) Date of Patent: Jan. 14, 2014

(54) CONFIGURING PARAMETERS OF A GUEST OPERATING SYSTEM BASED ON DETECTED EVENTS

(75) Inventor: Amit Shah, Pune (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/307,528

(22) Filed: Nov. 30, 2011

(65) Prior Publication Data

US 2013/0139153 A1 May 30, 2013

(51) Int. Cl.
*G06F 9/455* (2006.01)
(52) U.S. Cl.
USPC .................................................. 718/1
(58) Field of Classification Search
None
See application file for complete search history.

(56) References Cited

U.S. PATENT DOCUMENTS

| | | | | |
|---|---|---|---|---|
| 8,156,492 | B2 * | 4/2012 | Dahlstedt | 718/1 |
| 2009/0300173 | A1 * | 12/2009 | Bakman et al. | 709/224 |
| 2011/0041126 | A1 * | 2/2011 | Levy et al. | 718/1 |

* cited by examiner

*Primary Examiner* — Gregory A Kessler
(74) *Attorney, Agent, or Firm* — Lowenstein Sandler LLP

(57) ABSTRACT

A host controller system monitors virtual machine hosts for a tuning event. Upon detecting a tuning event, the host controller system identifies at least one virtual machine potentially affected by the tuning event, and determines whether a corresponding guest operating system should be tuned (e.g., whether configuration parameters should be adjusted). If so, the host controller system obtains configuration data for the corresponding guest operating system and provides the configuration data to the corresponding guest operating system.

21 Claims, 4 Drawing Sheets

CONFIGURING PARAMETERS OF A GUEST OPERATING SYSTEM BASED ON DETECTED EVENTS

TECHNICAL FIELD

Embodiments of the present invention relate to a computer system, and more specifically, to virtual machine management.

BACKGROUND

A virtual machine is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware of the host computer, making the use of the virtual machine transparent to the guest operating system and the user of the computer.

In a virtualization system, some of the virtual machine hosts may be changed. For example, a virtual hardware component of a virtual machine may be replaced with a different virtual hardware component. In another example, a virtual hardware component may be added or removed for a virtual machine. If a virtual machine component of a virtual machine is changed, removed or added, then the corresponding guest operating system may no longer run optimally or efficiently based on settings for the previous virtual machine components.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are systems and methods for tuning operating systems. In one embodiment, a host controller monitors virtual machine hosts for a tuning event. Upon detecting a tuning event, the host controller identifies at least one virtual machine potentially affected by the tuning event, and determines whether a corresponding guest operating system should be tuned. If so, the host controller obtains configuration data for the corresponding guest operating system and provides the configuration data to the corresponding guest operating system. The guest operating system then modifies its configuration parameters based on the configuration data.

With embodiments of the present invention, a host controller can select the best tunings possible for a particular guest operating system depending on current hardware and/or software of a corresponding virtual machine, and provide these tunings to the guest operating system. The guest operating system then activates those tunings, resulting in more efficient performance of the virtual machine.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
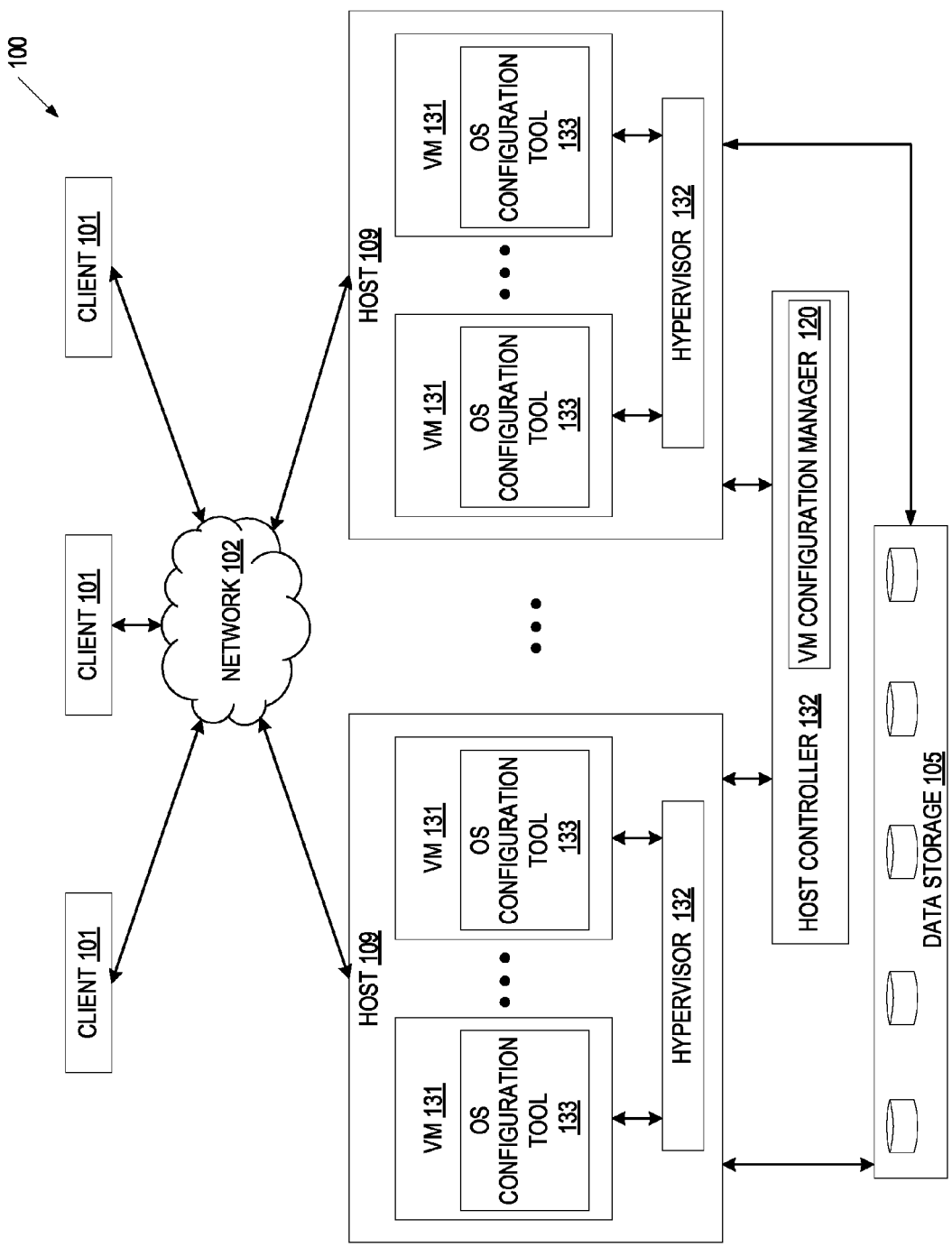
FIG. 1 is a block diagram of an exemplary network architecture in which embodiments of the invention may operate.

FIG. 1 illustrates an exemplary network architecture 100 in which embodiments of the present invention may operate. The network architecture 100 includes plurality of hosts 109 coupled to one or more clients 101 over a network 102. The hosts 109 may be a personal computer (PC), a server, a client, a personal digital assistant (PDA), a smart phone, a laptop computer, or any machine capable of executing a set of instructions (sequential or otherwise) that specify actions to be taken by that machine. The network 102 may be a private network (e.g., a local area network (LAN), a wide area network (WAN), intranet, etc.) or a public network (e.g., the Internet). The hosts 109 are also coupled to data storage 105. The data storage 105 includes one or more mass storage devices (e.g., disks), which form a storage pool shared by the hosts 109.

Each host 109 may host one or more virtual machines 131. Each virtual machine 131 runs a guest operating system (OS) that may be different from one virtual machine to another. The guest OS may include Microsoft Windows®, Linux®, Solaris®, Mac® OS, etc. Each host 109 may include a hypervisor 132 that emulates the underlying hardware platform for the virtual machines 131. The hypervisor 132 may also be known as a virtual machine monitor (VMM) or a kernel-based hypervisor. In some embodiments, the hypervisor 132 is part of a host operating system.

The clients 101 may include computing devices that have a wide range of processing capabilities. The clients 101 may access the virtual machines 131 over the network 102. In one scenario, each virtual machine 131 provides a virtual desktop for the client 101. From the user's point of view, the virtual desktop functions as a physical desktop (e.g., a personal computer) and is indistinguishable from a physical desktop.

The hosts 109 may be managed by a host controller 107. The host controller 107 may be a computer coupled to the hosts 109 directly or via a network. Alternatively, the host controller 107 may be part of one of the hosts 109. The host controller 107 may add a virtual machine, remove a virtual machine, change a virtual machine (e.g., add/remove/replace virtual hardware), power on/off the hosts 109, provide directory service to the virtual machines 131, and perform other managerial functions.

According to one embodiment of the present invention, the host controller 107 includes a VM configuration manager 120 to monitor and manage the virtual machines 131. The VM configuration manager 120 may monitor a host for pre-defined events (e.g., changes in one or more components of the host), such as a change in physical hardware of the host 108, a change in virtual hardware associated with a virtual machine 131, a change in host software (e.g., hypervisor 132), a change in software executing in a virtual machine 131, a change in a configuration parameter of a virtual machine 131, a new installation of a guest OS onto a VM, an upgrade of an existing OS on a VM, a change in a policy which identifies adjustments for a guest OS, etc. The above changes may affect one or more guest OSes running on the host 131. However, a guest OS may not be aware of these changes and/or the guest OS may not be aware of what settings it should use in a changed environment. In one embodiment, the VM configuration manager 120 may identify a guest operating system potentially affected by the detected event and determine whether the guest operating system should be tuned. If so, the VM configuration manager 120 obtains configuration data for the corresponding guest operating system and provides the configuration data to the corresponding guest operating system.

Each virtual machine 131 may have an operating system (OS) configuration tool 133. The OS configuration tool 133 may receive configuration data (e.g., data providing adjustments for the guest operating system on a virtual machine on the host) from the VM configuration manager 120 and causes at least one configuration parameter of a guest operating system to be adjusted, based on the configuration data received from the VM configuration manager 120. The VM configuration manager 120 and the OS configuration tool 33 may communicate with hypervisor 132 using a virtio-serial mechanism, which can be defined as a mechanism for communication in a virtualization system via multiple generic channels of a paravirtualized device. More specifically, it can provide a transport mechanism in a host machine for communication between the host userspace and/or kernelspace and the VM userspace and/or kernelspace. This transport mechanism may be a communication channel between the host machine and the VM with support for multiple ports, where stream input/output (I/O) is provided on each port. The transport mechanism may have two parts: (1) device emulation in the hypervisor that presents a device to the VM, and (2) a VM device driver that presents an interface to userspace or kernelspace applications on the VM in order to communicate with the hypervisor, to programs external to the hypervisor, and/or with other VMs. The communication channel may be virtio-based, where virtio is an abstraction over a native bus for an architecture so that virtio-based devices can be used for VM-host paravirtual communication, irrespective of the architecture of the VM or the host. For example, virtio is emulated on top of PCI on x86, whereas it uses a native bus on the s390 architecture. Alternatively, the VM configuration manager 120 and the OS configuration tool 133 may communicate using any other communication mechanism allowing exchange of messages between a virtual machine and a host controller. In one embodiment, the OS configuration tool 133 may receive configuration data directly from the VM configuration manager 120. In another embodiment, the OS configuration tool 133 may receive configuration data from the VM configuration manager 120 via the hypervisor 132.

Changes that affect one or more guest OSes may be initiated by a system administrator or occur automatically (e.g., according to an upgrade schedule or as part of a software operation). For example, the system administrator may change a network device or a block device (e.g., hard drive) in the virtual hardware. In another example, if an older version of the hypervisor is automatically upgraded to a new version in order to address bugs in the older version, this may change the way the hypervisor interacts with the guest OSes, which may change the adjustments which should be applied to the guest OSes. The VM configuration manager 120 may maintain a set of tunings for guest OS configuration parameters for each combination of hardware (physical and virtual) and software (host and VM).

A configuration parameter of an operating system may collectively refer to a setting, a parameter, a procedure, a protocol, an option, and a configuration of an operating system, which affects how the operating system executes and/or interfaces with hardware/software. When an operating system is installed to run under a hypervisor as part of a virtual machine, it may no longer have access to physical hardware devices, but rather emulated devices. As a result, an operating system may execute differently in order to run more efficiently on a virtual machine. One example of such a difference is the procedure an operating system may use when writing data to a memory and/or disk. When running in a non-virtualization environment, an operating system may cache data rather then write it directly to a disk, in order to minimize delays caused by writing data to a disk (e.g., delays caused by seek time). However, a virtual machine does not have a physical disk, and thus does not suffer from these delays. Hence, in a virtual environment, the procedure that the operating system uses for writing data to a disk may be changed such that data is written directly to disk and is not cached. The OS configuration tool 133 may change a configuration parameter defining a data writing procedure when the OS configuration tool 133 receives configuration data from the VM configuration manager 120. Other examples of configuration parameters include, but are not limited to, Transfer Control Protocol (TCP) window sizes, generic network settings, block sizes for cache, memory, and/or disks, procedures for writing to or reading from cache, memory, and/or disks (e.g., first in first out (FIFO) algorithm, completely fair queuing (CFQ) algorithm, deadline algorithm, etc.), buffer sizes, display settings, settings for communication protocols used by the operating system, power saving settings (e.g., suspension/sleep mode), etc. It should be understood that a variety of configuration parameters are possible for various operating systems, and that in different embodiments, the OS configuration tool 133 may adjust the variety of configuration parameters.

Configuration parameters for a guest operating system may be stored and/or located in a variety of locations within the guest operating system. For example, for a Windows® type operating system, configuration parameters may be stored in a registry or registry file. In another example, for Linux® type operating systems, configuration parameters may be stored or located in various configuration files, or may be stored within the kernel of the operating system. It should be understood that in different embodiments, the OS configuration tool 133 may access these locations to adjust the configuration parameters for different operating systems.

Figure 2:
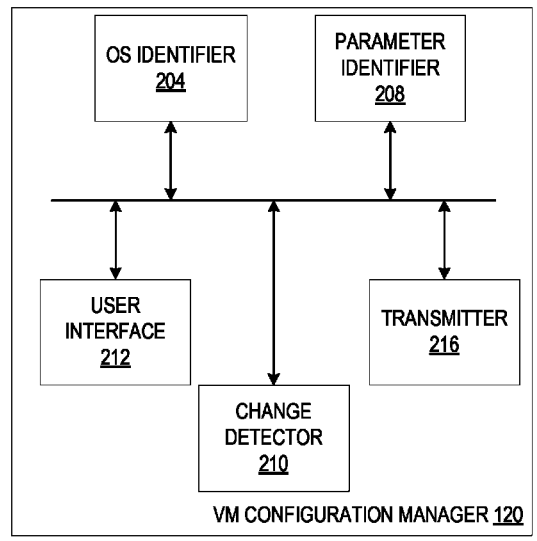
FIG. 2 is a block illustrating one embodiment of a virtual machine configuration manager.

FIG. 2 illustrates an embodiment of the VM configuration manager 120 in the host controller 107. The VM configuration manager 120 may include an OS identifier 204, a parameter identifier 208, a user interface 212, a change detector 210, and a transmitter 216, which are all associated with each other. More or less components may be included in the VM configuration manager 120 without loss of generality.

The change detector 210 may monitor the hosts 109 for pre-defined events. For example, an administrator of the host 109 may locally change (e.g., add, remove, and/or replace) hardware and/or software on the host 109 or the host controller may automatically change hardware and/or software on the host 109 according to an upgrade schedule, a maintenance event, etc. In another example, an end user can change software and/or configuration parameters of the virtual machine. The change detector 210 may monitor (e.g., periodically monitor) the hosts for such pre-defined events. For example, the change detector 210 may periodically communicate (e.g., via a message, flag, etc.) with the host 109 to inquire whether changes have been made to the host 109. In one embodiment, the change detector 210 may communicate with the hypervisor 132 to monitor for pre-defined events. For example, an administrator may make a change locally at the host 109 and the host 109 may send a message to the change detector 210 regarding the change made by the administrator. The operation of the change detector 210 according to one embodiment is described in more detail blow in conjunction with FIG. 4.

The OS identifier 204 may identify a guest operating system which may be affected by the pre-defined events detected by the change detector 210. For example, if a predefined event affects a specific type of OS, the OS identifier 204 may identify a guest operating system as a Linux® type operating or a Windows® type operating system. In another example, if a change occurred on specific hosts, the OS identifier 204 may identify what guest OSes are running on these hosts.

The user interface 210 may facilitate user input identifying one or more guest operating systems affected by a tuning event. Alternatively, when the OS identifier 204 identifies guest OSes affected by a tuning event, the user interface 210 may display a list of the affected guest OSes to a user. In one embodiment, the user interface 210 allows a user (e.g., a system administrator) to enter a set of policies specifying what guest OS tunings should be used for a certain combination of hardware and software. The policies may be provided for particular groups or pools of guest OSes. The guest OS groups may be formed based on OS type, OS geographical location, OS end user title or level of security, virtual software used (e.g., virtual NIC type, virtual hard disk type, etc.). For example, for a virtual hard disk which is backed by a regular file on the host system, the I/O scheduler of the guest OS may need to be tuned as "deadline" or "noop," which prevents the guest OS from performing any disk activity optimization and ensures that all disk activity is performed by the host. Alternatively, if the physical hardware presented to the guest OS is backed by an ISCSI partition on remote storage, the guest OS should be tuned to use the I/O scheduler to order I/O requests. In yet another example, guest OSes deployed for a specific department within an organization may have distinct tunings (e.g., guest OSes deployed for the R&D department may get access to the test labs but guest OSes deployed for the HR department may not get access to the test labs, etc.).

The parameter identifier 208 may identify one or more adjustments for configuration parameters of guest operating systems affected by a pre-defined event. In one embodiment, the parameter identifier 208 may access policies for tuning guest operating systems. The policies may include mappings of adjustments (e.g., values, settings, etc. for configuration parameters) to types of operating systems, hardware components, virtual hardware components, software and/or attributes of a host or virtual machine. These mappings may be stored in a memory (e.g., disk, hard drive, RAM) which is accessible by the host controller 132. The parameter identifier 208 may select a policy to identify adjustments for an operating system affected by a pre-defined event. In one embodiment, the parameter identifier 208 may select a policy to identify adjustments for new installations of guest operating systems and/or for upgrades of guest operating systems. In another embodiment, the policy may be used to apply adjustments to similar guests OSes. For example, a policy may be used to apply the same adjustments to all new guest installations of a certain type of guest OS. In one embodiment, if one or more policies are updated (e.g., changed), this may be a pre-defined event and the VM configuration manager 120 may apply the adjustments identified by the updated policy, to one or more guest OSes. In one embodiment, the adjustments may be optimal changes to configuration parameters (e.g., the optimal value, setting, etc., for a configuration parameter). However, in other embodiments, the adjustments may simply be changes to configuration parameters of one or more guest OSes.

In another embodiment, the parameter identifier 208 may operate in conjunction with the user interface 210 to facilitate creation of these policies. For example, the parameter identifier 208 may invoke the user interface 210 to allow a user to map an value for a configuration parameter of a certain type of operating system, to a virtual hardware component and store the mapping in a policy.

The transmitter 216 may transmit the configuration data generated and/or obtained by the parameter identifier 208, to the host 109. In one embodiment, the transmitter 216 may receive the configuration data from the parameter identifier 208 (e.g., via a message) and may transmit the configuration data to the host 109. The transmitter 216 may use and/or include the network interface device 822 of computer system 800 shown in FIG. 8.

Figure 3:
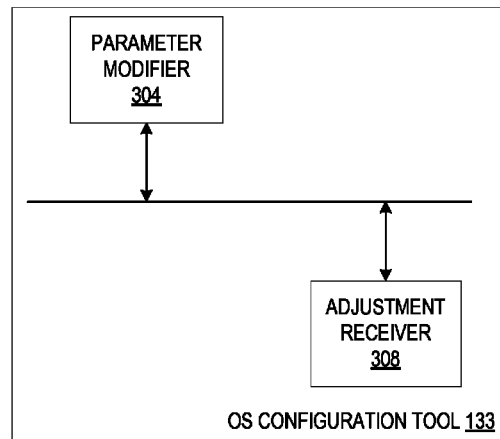
FIG. 3 is a block diagram illustrating one embodiment of an operating system configuration tool.

FIG. 3 illustrates an embodiment of the OS configuration tool 133 in the host 109. The OS configuration tool 133 may include parameter modifier 204 and an adjustment receiver 308, which are associated with each other. More or less components may be included in the OS configuration tool 133 without loss of generality.

The adjustment receiver 308 may receive configuration data from the VM configuration manager 120. The adjustment receiver 308 may use and/or include the network interface device 822 of the computer system 800 shown in FIG. 8.

The parameter modifier 304 may adjust the configuration parameters of a guest operating system on the host 109. The configuration data may include data used to adjust configuration parameters (e.g., a list of values for a plurality of configuration parameters). The parameter modifier 304 may tune the guest operating system or adjust at least one configuration parameter of the operating system based on the configuration data. For example, the configuration data may include a value of "256" for the configuration parameter "TCP window size." The parameter modifier 304 may set the configuration parameter "TCP window size" to the value 256, based on the configuration data.

Figure 4:
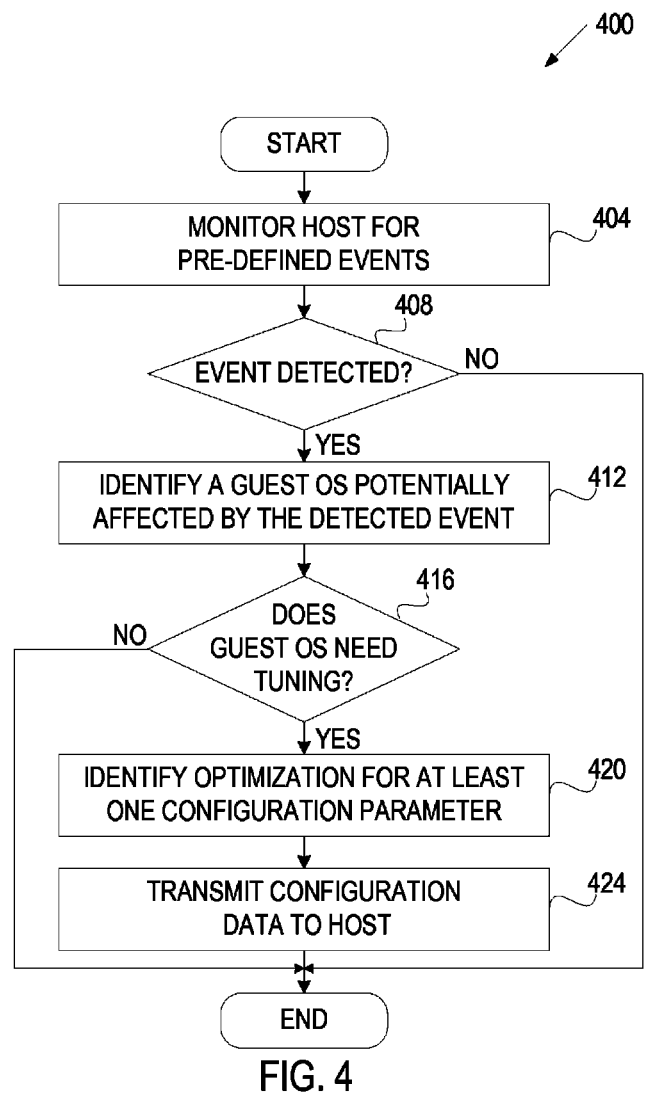
FIG. 4 is a flow diagram illustrating a method of tuning a guest operating system, according to one embodiment.

FIG. 4 is a flow diagram illustrating a method 400 of tuning a guest operating system, according to one embodiment. The method 400 may be performed by a computer system 800 of FIG. 5 that may comprise hardware (e.g., circuitry, dedicated logic, programmable logic, microcode, etc.), software (e.g., instructions run on a processing device), or a combination thereof. In one embodiment, the method 400 is performed by the VM configuration manager 120 (FIG. 1).

Referring to FIG. 4, the method 400 starts with the VM configuration manager 120 monitoring one or more hosts for pre-defined events (block 404). As discussed above, a pre-defined event may be a change in the host 109 (e.g., a change in hardware, virtual hardware, software, and/or attribute of a host 109 or VM 131). The VM configuration manager 120 may periodically communicate with a host 109 do determine if a pre-defined event has occurred or the VM configuration manager 120 may communicate with a host 109 at specified time and/or time intervals. Alternatively, the VM configuration manager 120 may wait for a host 109 to communicate to the VM configuration manger (e.g., via a message), indicating that a pre-defined event has occurred on the host 109.

At block 408, the VM manager 120 may determine if an event has occurred or been detected. If no events have been detected, the process 400 ends. If an event has been detected, the VM configuration manager 120 may identify one or more guest operating systems potentially affected by the detected event (block 412).

Next, the VM configuration manger 120 determines whether the guest operating system needs tuning (block 416). For example, the VM manager 120 may detect that the virtual hardware for a virtual machine 131 on a host 109 has been changed. The VM manger 120 will then determine whether the guest operating system needs to be tuned based on the change in the host 109. If the guest operating system does not need tuning, the process 400 ends.

If the guest operating system does need tuning, the VM configuration manager 120 identifies an adjustment for at least one configuration parameter of the guest operating system (block 420). In one embodiment, the VM configuration manager 120 may identify a plurality of adjustments for a plurality of configuration parameters. The VM configuration manager 120 may use policies (e.g., mappings of values for configuration parameters to pools of guest operating systems or physical/virtual hardware components) to identify an adjustment. For example, a policy may provide an adjustment for the "TCP window size" configuration parameter for a certain type of virtual network card. In another example, a policy may provide an adjustment for certain types of guest operating systems, like the Linux® type operating system. After identifying an adjustment for at least one configuration parameter and generating configuration data, VM configuration manager transmit the configuration data to the host 109 (block 424).

Figure 5:
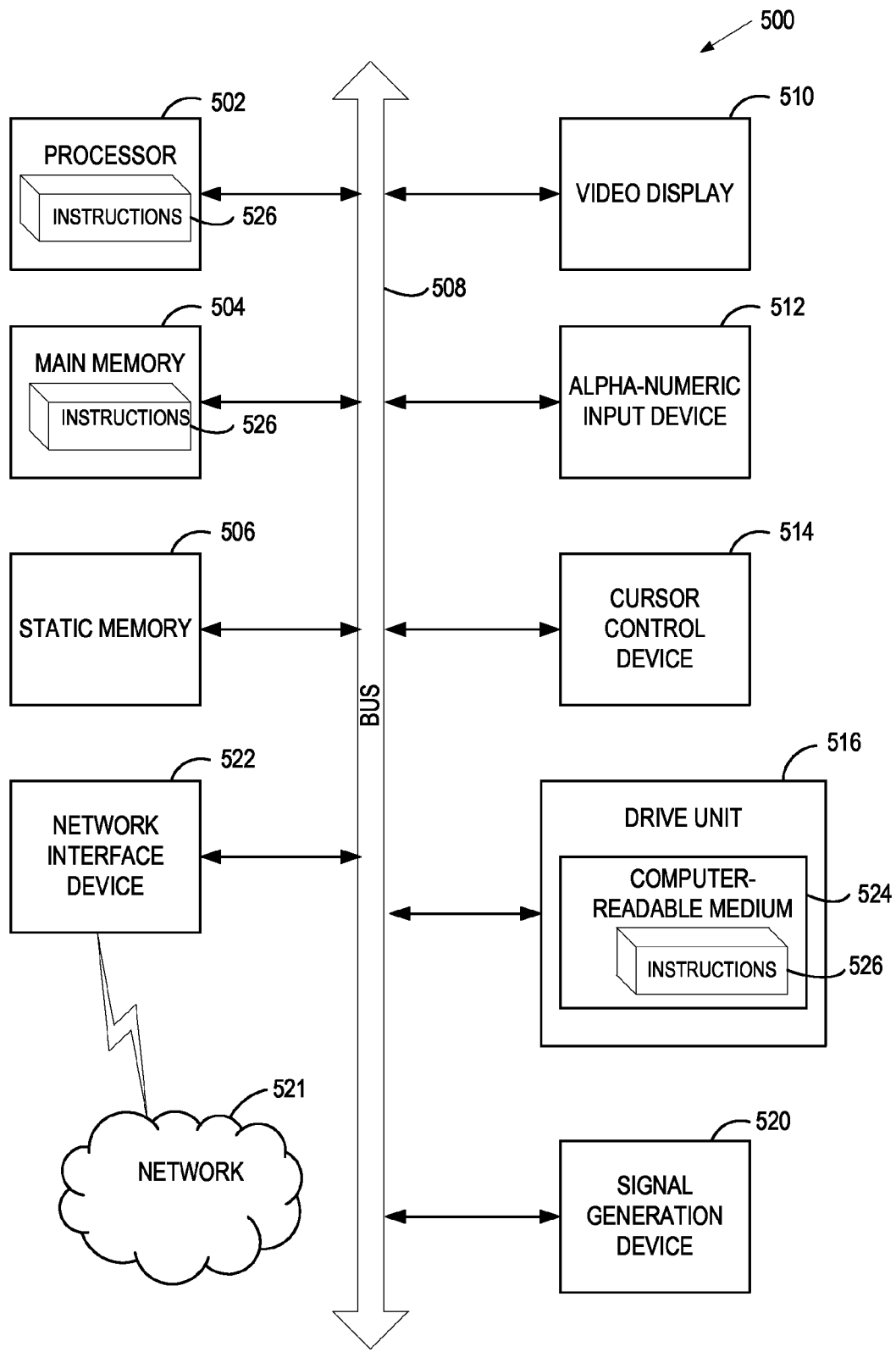
FIG. 5 illustrates a diagrammatic representation of a guest operating system tuning system.

FIG. 5 illustrates a diagrammatic representation of a guest operating system tuning system 500, within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 of virtual machine configuration manager 120 and/or the operating system configuration tool 133 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions 526 of the virtual machine configuration manager 120 and/or the operating system configuration tool 133) embodying any one or more of the methodologies or functions described herein. The instructions 526 the virtual machine configuration manager 120 and/or the operating system configuration tool 133 may also reside, completely or at least partially, within the main memory 504 and/or within the processor 502 during execution thereof by the computer system 500, the main memory 504 and the processor 502 also constituting computer-readable media. The instructions 526 of the virtual machine configuration manager 120 and/or the operating system configuration tool 133 may further be transmitted or received over a network 521 via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting", "identifying", "obtaining", "transmitting", "receiving", "causing", "displaying", "providing", "setting", "updating", "storing", "creating", "tuning", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method comprising:
monitoring, by a host controller system, a plurality of virtual machine hosts for a tuning event, each virtual machine host comprising one or more virtual machines, each virtual machine having a guest operating system;
upon detecting the tuning event, identifying, by the host controller system, a guest operating system potentially affected by the tuning event;
determining, by the host controller system, that the guest operating system is to be tuned;
identifying, by the host controller system, an adjustment for a configuration parameter of the guest operating system; and
providing, by the host controller system, configuration data to the host computer system, the configuration data comprising an adjustment for the configuration parameter of the guest operating system.

2. The computer-implemented method of claim 1, further comprising:
providing, by the host controller system, a user interface facilitating user input identifying guest operating systems to be tuned; and
storing operating system data identifying the guest operating systems to be tuned.

3. The computer implemented method of claim 2, wherein determining that the guest operating system is to be tuned is based on the operating system data.

4. The computer-implemented method of claim 1, wherein the tuning event comprises at least one of a change in physical hardware components of a corresponding virtual machine host, a change in virtual hardware components of a corresponding virtual machine, a change in software on the corresponding virtual machine host, a change in a policy for tuning operating systems, and a change in one or more attributes of the corresponding virtual machine.

5. The computer-implemented method of claim 1, further comprising identifying at least one configuration parameter of the guest operating system to be adjusted based on the tuning event.

6. The computer-implemented method of claim 1, further comprising:
creating one or more policies for tuning operating systems, the policies providing a mapping of adjustments to host computer system components; and
selecting a relevant policy to identify the adjustment for the at least one configuration parameter of the guest operating system.

7. The computer-implemented method of claim 6, wherein the one or more policies provide different sets of adjustments to different pools of guest operating systems.

8. An apparatus comprising:
a processing device to:
monitor a plurality of virtual machine hosts for a tuning event, each virtual machine host comprising one or more virtual machines, each virtual machine having a guest operating system;
upon detecting the tuning event, identify a guest operating system potentially affected by the tuning event;
determine that the guest operating system is to be tuned;
identify an adjustment for a configuration parameter of the guest operating system; and
provide configuration data to the host computer system, the configuration data comprising an adjustment for the configuration parameter of the guest operating system.

9. The apparatus of claim 8, wherein the processing device is further to:
provide a user interface facilitating user input identifying guest operating systems to be tuned; and
store operating system data identifying the guest operating systems to be tuned.

10. The apparatus of claim 9, wherein determining that the guest operating system is to be tuned is based on the operating system data.

11. The apparatus of claim 8, wherein the tuning event comprises at least one of a change in physical hardware components of a corresponding virtual machine host, a change in virtual hardware components of a corresponding virtual machine, a change in software on the corresponding virtual machine host, a change in a policy for tuning operating systems, and a change in one or more attributes of the corresponding virtual machine.

12. The apparatus of claim 8, wherein the processing device is further to identify at least one configuration parameter of the guest operating system to be adjusted based on the tuning event.

13. The apparatus of claim 8, wherein the processing device is further to:
create one or more policies for tuning operating systems, the policies providing a mapping of adjustments to host computer system components; and
select a relevant policy to identify the adjustment for the at least one configuration parameter of the guest operating system.

14. The apparatus of claim 13, wherein the one or more policies provide different sets of adjustments to different pools of guest operating systems.

15. A non-transitory machine-readable storage medium comprising data that, when accessed by a processing device, cause the processing device to perform operations comprising:
monitoring, by the processing device, a plurality of virtual machine hosts for a tuning event, each virtual machine host comprising one or more virtual machines, each virtual machine having a guest operating system;
upon detecting the tuning event, identifying a guest operating system potentially affected by the tuning event;
determining that the guest operating system is to be tuned;
identifying an adjustment for a configuration parameter of the guest operating system; and
providing configuration data to the host computer system, the configuration data comprising an adjustment for the configuration parameter of the guest operating system.

16. The non-transitory machine-readable storage medium of claim 15, wherein the operations further comprise:
providing a user interface facilitating user input identifying guest operating systems to be tuned; and
storing operating system data identifying the guest operating systems to be tuned.

17. The non-transitory machine-readable storage medium of claim 16, wherein determining that the guest operating system is to be tuned is based on the operating system data.

18. The non-transitory machine-readable storage medium of claim 15, wherein the tuning event comprises at least one of a change in physical hardware components of a corresponding virtual machine host, a change in virtual hardware components of a corresponding virtual machine, a change in software on the corresponding virtual machine host, a change in a policy for tuning operating systems and a change in one or more attributes of the corresponding virtual machine.

19. The non-transitory machine-readable storage medium of claim 15, wherein the method further comprising identifying at least one configuration parameter of the guest operating system to be adjusted based on the tuning event.

20. The non-transitory machine-readable storage medium of claim 15, wherein the operations further comprise:
creating one or more policies for tuning operating systems, the policies providing a mapping of adjustments to host computer system components; and
selecting a relevant policy to identify the adjustment for the at least one configuration parameter of the guest operating system.

21. The non-transitory machine-readable storage medium of claim 20, wherein the one or more policies provide different sets of adjustments to different pools of guest operating systems.

* * * * *